US009285238B2

United States Patent
Nogawa et al.

(10) Patent No.: US 9,285,238 B2
(45) Date of Patent: Mar. 15, 2016

(54) NAVIGATION SERVER, NAVIGATION APPARATUS, AND NAVIGATION SYSTEM

(75) Inventors: Tadafumi Nogawa, Minato-ku (JP); Satoshi Murata, Minato-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 1498 days.

(21) Appl. No.: 12/377,279

(22) PCT Filed: Jul. 17, 2007

(86) PCT No.: PCT/JP2007/064079
§ 371 (c)(1),
(2), (4) Date: Jul. 29, 2010

(87) PCT Pub. No.: WO2008/020521
PCT Pub. Date: Feb. 21, 2008

(65) Prior Publication Data
US 2010/0286906 A1    Nov. 11, 2010

(30) Foreign Application Priority Data
Aug. 17, 2006    (JP) .................. 2006-222734

(51) Int. Cl.
G01C 21/00    (2006.01)
G01C 21/36    (2006.01)
G01C 21/30    (2006.01)
G08G 1/0968   (2006.01)
G09B 29/10    (2006.01)

(52) U.S. Cl.
CPC ............ *G01C 21/3667* (2013.01); *G01C 21/30* (2013.01); *G08G 1/096827* (2013.01); *G08G 1/096844* (2013.01); *G09B 29/10* (2013.01)

(58) Field of Classification Search
None
See application file for complete search history.

(56) References Cited

U.S. PATENT DOCUMENTS

| 6,263,276 | B1* | 7/2001 | Yokoyama et al. ........... 701/420 |
| 6,434,478 | B1* | 8/2002 | Ikeda ............................ 701/533 |
| 2004/0133344 | A1* | 7/2004 | Hashida ................ G01C 21/32 701/532 |
| 2006/0069503 | A1* | 3/2006 | Suomela et al. .............. 701/211 |
| 2006/0173614 | A1* | 8/2006 | Nomura ................ G01C 21/32 701/425 |
| 2006/0229806 | A1* | 10/2006 | Forlenza et al. ............. 701/207 |

FOREIGN PATENT DOCUMENTS

| JP | 9-145383 | 6/1997 |
| JP | 2000-36097 | 2/2000 |

(Continued)

*Primary Examiner* — Paul Danneman
(74) *Attorney, Agent, or Firm* — Nelson Mullins Riley & Scarborough LLP; Anthony A. Laurentano

(57) ABSTRACT

Provided is a navigation system capable of matching map information used by a navigation apparatus and a navigation server with an appropriate frequency and at an appropriate timing. When there is differential information between the navigation map information and the support map information, index information for identifying the differential information is transmitted from the navigation server to the navigation apparatus and the navigation apparatus outputs preliminary information indicating a brief summary of the differential information generated according to the index information. When a request signal based on a request operation by a user in the navigation apparatus is transmitted from the navigation apparatus to the navigation server, the differential information is transmitted form the navigation server to the navigation apparatus, so that the navigation map information is updated in accordance with the differential information.

5 Claims, 5 Drawing Sheets

(56) References Cited

FOREIGN PATENT DOCUMENTS

| JP | 2000-97716 | 4/2000 |
|----|------------|--------|
| JP | 2002-48574 | 2/2002 |
| JP | 2002-296042 | 10/2002 |
| JP | 2003-77095 | 3/2003 |
| JP | 2004-37331 | 2/2004 |
| JP | 2004-77254 | 3/2004 |
| JP | 2004-126035 | 4/2004 |
| JP | 2004-177770 | 6/2004 |
| JP | 2004-354149 | 12/2004 |
| JP | 2006-65246 | 3/2006 |

* cited by examiner

US 9,285,238 B2

NAVIGATION SERVER, NAVIGATION APPARATUS, AND NAVIGATION SYSTEM

PRIORITY CLAIM

The present application is a 35 U.S.C. 371 filing of International Patent Application Number PCT/JP2007/064079 tiled on Jul. 17, 2007, which is based on and claims the priority benefit of Japanese Patent Application 2006-222734 filed on Aug. 17, 2006, the contents of which are incorporated herein by reference in its entirety.

BACKGROUND OF THE INVENTION

1. Field of the Invention

The present invention relates to a navigation server which supports a guidance of a mobile subject guided by a navigation apparatus on the basis of communication with the navigation apparatus, a navigation apparatus which guides the mobile subject on the basis of communication with the navigation server, and a navigation system comprised of the navigation server and the navigation apparatus.

2. Description of the Related Art

There has been disclosed an art (for example, refer to Japanese Patent Laid-open No. 2002-296042, paragraphs 0008 to 0009) in which differential information between map information of an old version and map information of a new version is transmitted from a navigation server to a navigation apparatus in accordance with the opening of a new road or the like, and the map information of the old version which is stored in a memory element of the navigation apparatus is updated to the map information of the new version according to the differential information.

From the viewpoint of curtailing communication cost or the like on the differential information transmitted from the navigation server to the navigation apparatus, there has been disclosed an art which transmits to the navigation apparatus only the differential information having high necessity to a user (for example, refer to Japanese Patent Laid-open No. 2006-065246, paragraphs 0009 to 0010 and FIG. 2). Specifically, the difference between the map information used respectively by the navigation apparatus and the navigation server is determined according to the difference between a length of a route (predicted travel distance) searched by the navigation apparatus and a length of a route searched by the navigation server according to an identical algorithm, respectively. Thereafter, according to the determination result on the difference between the map information, the differential information of an area along the route searched by the navigation server is transmitted to the navigation apparatus.

However, even though the map information used by the navigation apparatus and the navigation server are different, it is possible that the routes searched respectively by the navigation apparatus and the navigation server according to an identical algorithm are the same. Thereby, when a vehicle is positioned on a road which is not included in the map information used by the navigation apparatus, the search of a route by the navigation apparatus may end unsuccessfully. As a result, this may cause the update of the map information in the navigation apparatus according to the determination result on the difference between the routes searched respectively by the navigation apparatus and the navigation server to end unsuccessfully.

SUMMARY OF THE INVENTION

The present invention has been accomplished in view of the aforementioned problems, and it is therefore an objective of the present invention to provide a navigation system and the like capable of comparing and matching map information used respectively by a navigation apparatus and a navigation server at appropriate frequency and timing by considering the necessity of updating the map information used by the navigation apparatus.

According to a first aspect of the present invention, there is provided a navigation apparatus which guides a mobile subject on the basis of communication with a navigation server, including: a navigation map storing element configured to store navigation map information; a first processing element configured to recognize index information for identifying differential information between the navigation map information stored in the navigation map storing element and support map information stored in a support map storing element provided in the navigation server on the basis of communication with the navigation server; and a second processing element configured to recognize a departure or present position and a destination position of the mobile subject, to search or define a navigation route joining the departure or present position and the destination on the basis of the navigation map information, to determine whether the differential information is present in a subject area containing the navigation route on the basis of the index information recognized by the first processing element, to generate and output preliminary information indicating a brief summary of the differential information on the basis of the index information on a condition that it is determined that the differential information is present in the subject area, to determine whether a request operation by a user is present, to transmit a request signal for the differential information to the navigation server on a condition that it is determined that the request operation is present, and to receive the differential information from the navigation server and update the navigation map information on the basis of the differential information.

According to the navigation apparatus of the first aspect of the present invention, in the case where the differential information is present between the navigation map information and the support map information, the index information of the differential information is recognized, and the preliminary information indicating a brief summary of the differential information is generated and output on the basis of the index information. Subsequently, the differential information is transmitted from the navigation server to the navigation apparatus on a condition that the request operation by a user performed on the navigation apparatus is present. Thereby, the navigation map information is updated on the basis of the differential information.

After the brief summary of the differential information is recognized by a user through outputting the preliminary information from the navigation apparatus, the user may determine whether it is necessary to perform a request operation on the navigation apparatus, in other words, whether it is necessary to update the navigation map information on the basis of the differential information. Accordingly, the differential information which possesses poor necessity to the user may be avoided from being sent to the navigation apparatus, thereby, to save information processing resources used by the navigation server and the navigation apparatus, such as to communicate, memorize the differential information.

Moreover, the index information and the differential information which may be transmitted to the navigation apparatus are refined to those included in a subject area corresponding to a destination position of a mobile subject. Accordingly, the index information and the differential information which are considered to possess poor necessity from the viewpoint of the search of a route to the destination position by the navigation apparatus, thereby, to save information processing resources used to communicate the differential information or the like. As a result, it is expected to efficiently utilize communication resources and save communication cost between the navigation server and the navigation apparatus.

Moreover, by considering the necessity level of updating the navigation map information from the viewpoint of guiding the mobile subject from a departure or present position to a destination position thereof, the navigation map information used respectively by the navigation apparatus and the navigation server may be compared and matched at appropriate frequency and timing.

A second aspect of the present invention is dependent on the navigation apparatus of the first aspect, wherein the second processing element is configured to receive the index information representing coordinates of plural locations in a newly opened road which serves as the differential information and output a line joining the plural locations as the preliminary information.

According to the navigation apparatus of the third aspect of the present invention, a brief summary of a newly opened road which serves as the differential information, namely the preliminary information indicating a rough position, shape and the like of the newly opened road is output. Thereby, it is possible for a user to determine appropriately whether the differential information is necessary or not.

A navigation server of a third aspect of the present invention which supports a guidance of a mobile subject guided by a navigation apparatus on the basis of communication with the navigation apparatus, includes: a support map storing element configured to store support map information; a first support processing element configured to recognize version information indicating a version of navigation map information stored in a navigation map storing element which is provided in the navigation apparatus, and a navigation identifier for identifying the navigation apparatus, on the basis of communication with the navigation apparatus, to determine whether differential information between the navigation map information and the support map information stored in the support map storing element is present or not on the basis of the version information, and to transmit index information of the differential information to the navigation apparatus identified by the navigation identifier in the case where it is determined that the differential information is present to generate and output preliminary information indicating a brief summary of the differential information; and a second support processing element configured to transmit the differential information to the navigation apparatus on a condition that a request signal for the differential information in accordance with a request operation by a user performed on the navigation apparatus is received from the navigation apparatus to which the index information has been transmitted by the first support processing element.

According to the navigation server of the third aspect of the present invention, in the case where the differential information is present between the navigation map information and the support map information, the index information representing the differential information is recognized by the navigation apparatus, and the preliminary information indicating a brief summary of the differential information is generated and output by the navigation apparatus on the basis of the index information. Subsequently, the differential information is transmitted to the navigation apparatus on a condition that the request operation by a user performed on the navigation apparatus is present. Thereby, the navigation map information may be updated on the basis of the differential information.

According thereto, only the navigation map information is updated on the basis of the differential information of a subject area having high necessity to a user from the viewpoint of searching a navigation route to the destination position by the navigation apparatus. Thereby, by considering the necessity level of updating the navigation map information used in the search of a navigation route, the navigation map information used respectively by the navigation apparatus and the navigation server may be compared and matched at appropriate frequency and timing.

A navigation system of a fourth aspect of the present invention is comprised of the navigation apparatus of the first aspect and the navigation server of the third aspect of the present invention.

According to the navigation server of the fourth aspect of the present invention, the navigation map information used respectively by the navigation apparatus and the navigation server may be compared and matched at appropriate frequency and timing by considering the necessity level of updating the navigation map information from the viewpoint of guiding the mobile subject from a departure or present position of the mobile subject to a destination position thereof.

DETAILED DESCRIPTION OF THE PREFERRED EMBODIMENTS

Hereinafter, embodiments of a navigation server, a navigation apparatus and a navigation system according to the present invention will be described in detail with reference to the drawings.

The configuration of the navigation system of the present invention will be described with reference to FIG. 1.

Figure 1:
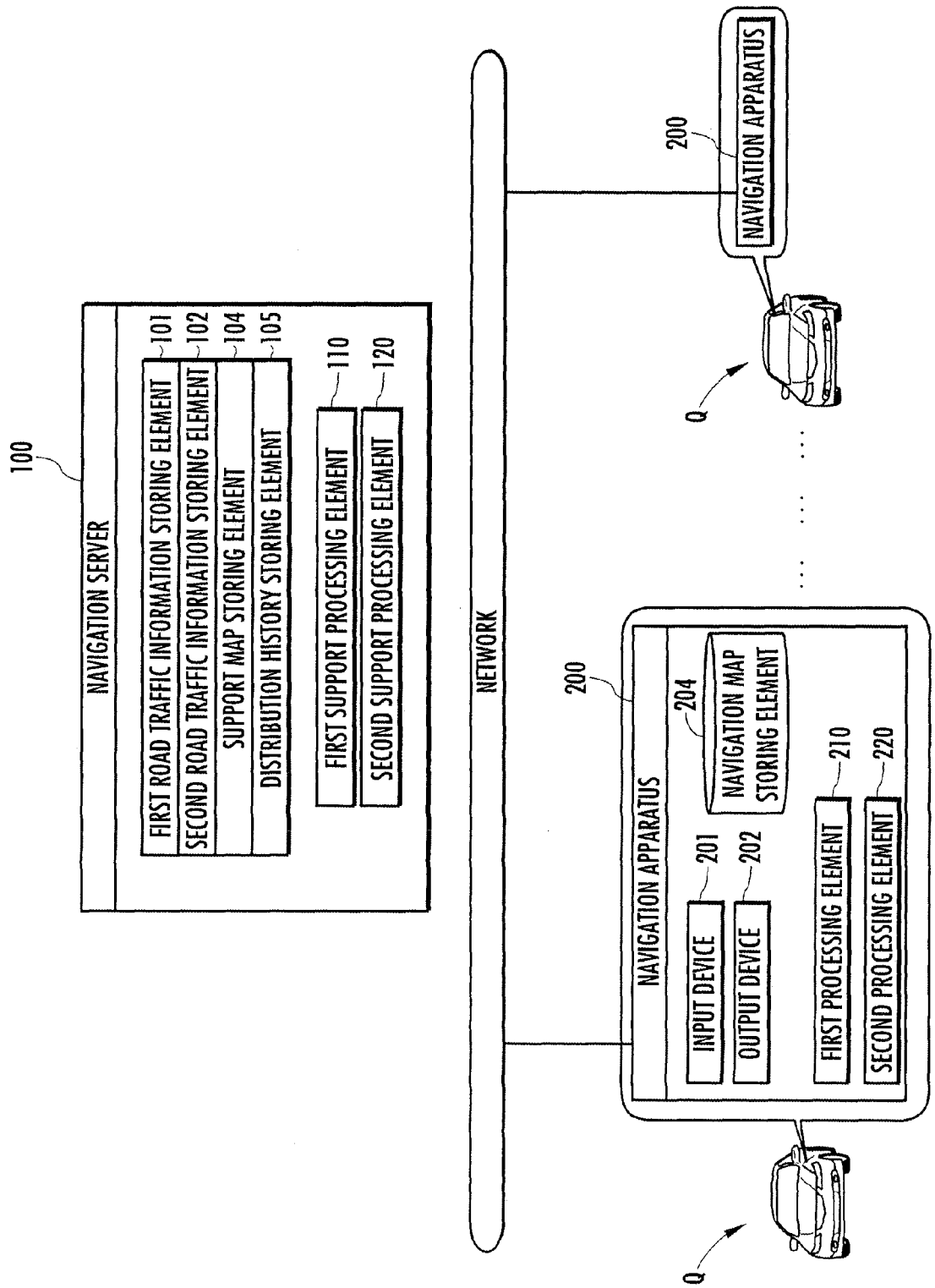
FIG. 1 is a structural diagram illustrating a configuration of a navigation system according to the present invention.

The navigation system illustrated in FIG. 1 is comprised of a navigation server 100, and a navigation apparatus 200 which is mounted in a vehicle (mobile subject) Q. It is also acceptable for the navigation apparatus 200 to be carried by a user who is equivalent to the mobile subject.

The navigation server 100 is comprised of one or a plurality of server computers (composed of CPU, ROM, RAM, I/O and the like). The navigation server 100 is provided with a first road traffic information storing element 101, a second road traffic information storing element 102, a support map storing element 104, a distribution history storing element 105, a first support processing element 110, and a second support processing element 120.

The first road traffic information storing element 101 is stored with first road traffic information (required moving time, traffic congestion information or the like for an individual link) which is based on probe information (position of an individual probe car at an individual timing) transmitted or uploaded from the navigation apparatus 200 to the navigation server 100. The navigation apparatus 200 is mounted in a vehicle Q which serves as a probe car or a floating car.

The second road traffic information storing element 102 is stored with second road traffic information (traffic regulation information, event information of an event around an individual link, type information of the event if there were an event and the like, in addition to the required moving time and the traffic congestion information for the individual link) transmitted from a road traffic information center server or the like to the navigation server 100.

The support map storing element 104 is stored with support map information. In the support map information, the location, shape and posture or the like of an individual link constituting a road are expressed by a series of coordinates ((latitude, longitude), or (latitude, longitude, altitude)). Moreover, an individual link is tagged with link identifier for identifying the individual link and road type data. The support map information is updated successively through automatic input or manual input of information which is related to the open or close of a road or the like.

The distribution history storing element 105 is stored with a combined information of a navigation identifier of an individual navigation apparatus 200, and index information of differential information which has been distributed to the navigation apparatus 200.

The first support processing element 110, on the basis of communication with the navigation apparatus 200, recognizes version information ver representing aversion of navigation map information, and the navigation identifier ID for identifying the navigation apparatus 200.

Moreover, the first support processing element 110 determines whether the differential information $d_i$ between the navigation map information of a version represented by the version information ver and the support map information stored in the support map information storing element 104 is present or not. If the differential information $d_i$ is present, the first support processing element 110 transmits the index information $idx(d_i)$ for identifying the differential information $d_i$ to the navigation apparatus 200 which is identified by the navigation identifier ID.

The second support processing element 120 transmits the differential information $d_i$ to the navigation apparatus 200 on a condition that a request signal Req in accordance with a request operation by a user demanding for the differential information $d_i$ is received from the navigation apparatus 200 to which the index information $idx(d_i)$ has been transmitted by the first support processing element 110.

The navigation apparatus 200 is comprised of an ECU or a computer (constituted from a CPU, a ROM, a RAM, an I/O and the like) mounted in the vehicle Q as hardware, and a navigation program which provides the computer with various functions. It should be noted that the navigation program may be pre-installed in the memory (ROM) in the vehicular computer, or the entire or a part of the navigation program may be downloaded or broadcasted from a server (not shown) via a network or a satellite to the vehicular computer to be stored in the memory (EEPROM, RAM) or the like thereof at an arbitrary timing when there is a request or the like from the vehicular computer.

The navigation apparatus 200 is provided with an input device 201, an output device 202, a navigation map storing element 204, a first processing element 210 and a second processing element 220.

The input element 201 is comprised of operating buttons or a microphone disposed in a center console or the like of the vehicle 2. It is possible for a user to perform various settings by operating or vocally instructing the input element 201. The output device 202 is a display element disposed in the center console of the vehicle 2 for displaying or outputting navigation map information or the like.

The navigation map storing element 204 is stored with the navigation map information or the like to be output to the output device 202. In the navigation map information, the location, shape and posture or the like of an individual link constituting a road are expressed by a series of coordinates. Moreover, an individual link is tagged with the link identifier for identifying the individual link. The navigation map information is tagged with the version information indicating the version of the navigation map information. Even though the definitions of the coordinates in the navigation map information and the support map information are different due to the different specifications and data architectures therebewteen, it is possible to match the links by tagging the identical links with common link identifier.

The first processing element 210 recognizes the presence or absence of the differential information $d_i$ between the navigation map information stored in the navigation map storing element 204 and the support map information stored in the support map storing element 104 provided in the navigation server 100, and the index information $idx(d_i)$ for identifying or specifying the differential information $d_i$ on the basis of communication with the navigation server 100.

On the basis of the navigation map information or the like stored in the navigation map storing element 204, the second processing element 220 searches or defines a navigation route r which is composed of a plurality of links and joins the present position $p_1$ and the destination position $p_2$ of the vehicle Q.

The second processing element 220 determines whether or not the differential information $d_i$ is present in a subject area S containing the navigation route r on the basis of the index information $idx(d_i)$ recognized by the first processing element 210. Subsequently, the second processing element 220 generates and outputs preliminary information $pre(d_i)$ indicating a brief summary of the differential information $d_i$ on a condition that the differential information $d_i$ is present in the subject area S.

Moreover, the second processing element 220 recognizes whether a request operation by a user is present or not, and demands the differential information $d_i$ from the navigation server 100 on a condition that a request operation is present. Thereafter, the second processing element 220 updates the navigation map information on the basis of the differential information $d_i$ received from the navigation server 100.

It should be noted that "a component of the navigation server 100 or the navigation apparatus 200 which serves as hardware "recognizes" information" means that the component performs a possible information processing on a piece of information to prepare the piece of information ready for other information processing, for example, the component receives the piece of information; searches the piece of information in a database or memory or retrieves the piece of information from a database or memory; calculates, estimates, configures, determines, searches the piece of information or the like via arithmetic processing on the basis of the received basic information or the like; visualizes information by decoding packages; and stores in memory or the like the calculated information or the like. In addition, "a component serving as hardware "outputs" information" means that the component outputs the information in form of picture, voice, vibration and the like, which may be recognized by a human by means of five senses thereof such as eyesight, hearing, touch, etc.

The function of the navigation system with the above-mentioned configuration will be explained with reference to FIG. 2 through FIG. 5.

The power is supplied to the navigation apparatus 200 as an ignition switch of the vehicle Q is switched from OFF to ON by the user. After the navigation apparatus 200 is switched from OFF to ON, the first processing element 210 transmits the version information ver indicating a version of the navigation map information and the navigation identifier ID for identifying the navigation apparatus 200 to the navigation server 100 (FIG. 2/ Arrow A1).

Figure 2:
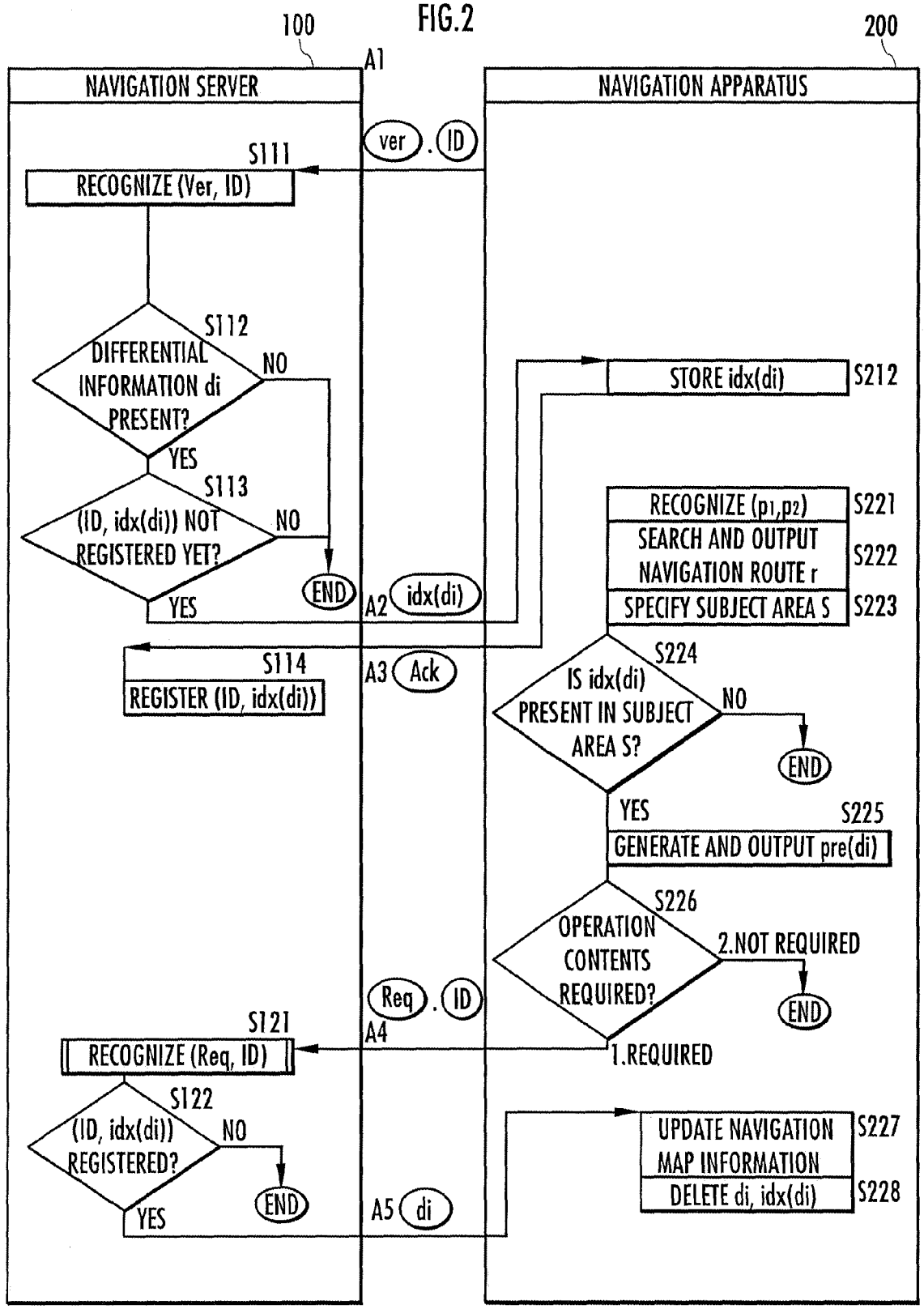
FIG. 2 is a functional diagram illustrating the functions of the navigation system according to the present invention.

According thereto, the first support processing element 110 in the navigation server 100 recognizes the version information ver and the navigation identifier ID (FIG. 2/S111). Thereafter, the first support processing element 110 determines whether the differential information $d_i$ between the navigation map information and the support map information is present or not on the basis of the version information ver (FIG. 2/S112). For example, in the case where a newly opened road $r_0$ illustrated in FIG. 3 by a dashed line is not included in the navigation map information while it has been added to the support map information of a newer version than the navigation map information, the differential information $d_i$ representing the newly opened road $r_0$ is present in the subject area S.

In the case where the differential information $d_i$ is present (FIG. 2/S112 . . . YES), the first support processing element 110 determines whether a combination of the navigation identifier ID and the index information $idx(d_i)$ of the differential information $d_i$ is registered or stored in the distribution history storage 105 (FIG. 2/S113). The index information $idx(d_i)$ includes coordinates representing a plurality of locations in the newly opened road $r_0$ ((latitude, longitude) or (latitude, longitude, altitude)), road category (toll road, toll-free road, expressway, general road, or the like), meshes included in the newly opened road $r_0$, link identifier for an individual link constituting the newly opened road $r_0$ and validity period (the open time or the close time of the road, the open period or the close period of the road, or the like). In case where the combined information (ID, $idx(d_i)$) is determined to have not been registered or stored in the distribution history storing element 105 (FIG. 2/S113 . . . YES), the first support processing element 110 transmits the index information idx ($d_i$) to the navigation apparatus 200 which is identified by the navigation identifier ID (FIG. 2/Arrow A2).

According thereto, the first processing element 210 in the navigation apparatus 200 stores the index information idex ($d_i$) in a memory device such as a memory and the like (FIG. 2/S212), and transmits an acknowledge notice Ack of the index information $idx(d_i)$ to the navigation server 100 (FIG. 2/Arrow A3).

According thereto, the first support processing element 110 in the navigation server 100 stores the combination of the navigation identifier ID and the index information $idx(d_i)$ in the distribution history storing element 105 (FIG. 2/S113).

Figure 4:
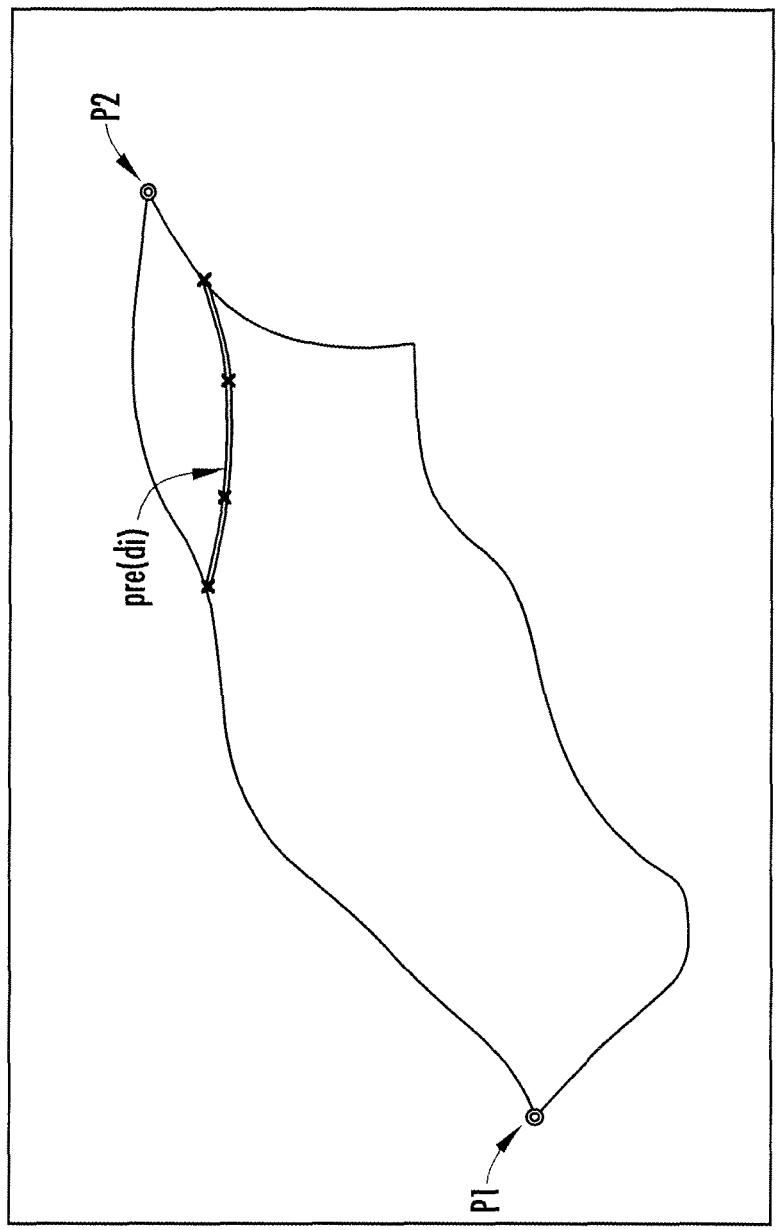
FIG. 4 is a functional diagram illustrating the functions of the navigation system according to the present invention.

On the other hand, in the case where the differential information $d_i$ is determined to be absent (FIG. 4/S112 . . . NO), or the combination of the navigation identifier ID and the index information $idx(d_i)$ is determined to have been stored in the distribution history storing element 105 (FIG. 2/113 . . . NO), the current processing is terminated.

The second processing element 220 recognizes the present position $p_1$ and the destination position $p_2$ of the vehicle Q (FIG. 2/S211). The present position $p_1$ of the vehicle Q is calculated or determined according to an arithmetic computation on GPS signals received by a vehicular GPS receiver, or output signals from a vehicular acceleration sensor, a vehicular gyro sensor or the like. The destination position $p_2$ of the vehicle Q is inputted to the navigation apparatus 200 via the input device 201 according to operations performed by the user or the like.

Figure 3:
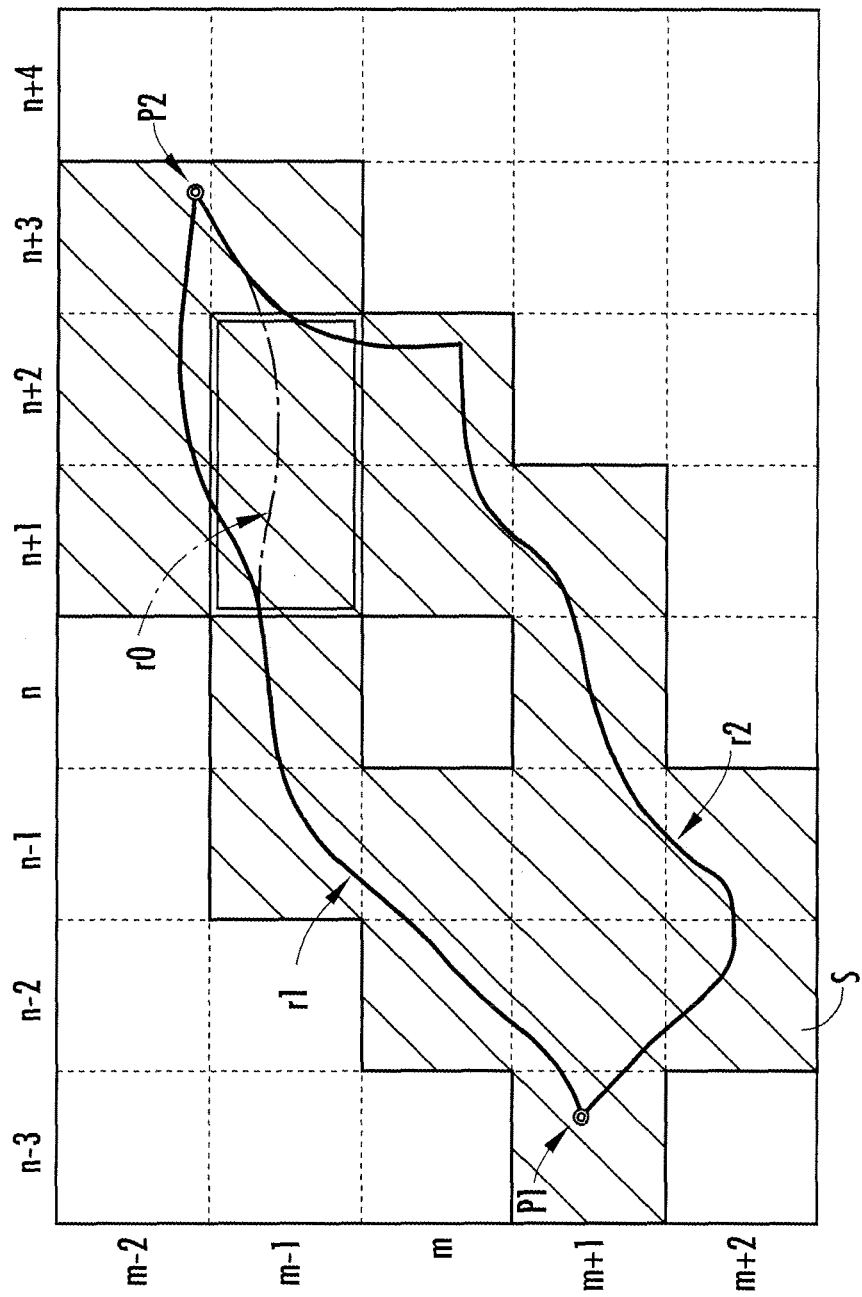
FIG. 3 is a functional diagram illustrating the functions of the navigation system according to the present invention.

Thereafter, the second processing element 220 retrieves the navigation map information from the map storing element 204. On the basis of the retrieved navigation map information, the second processing element 220 searches one or a plurality of navigation route r joining the present position recognized by the first processing element 210 and the destination position $p_2$, and outputs the navigation route r to the output device 202 (FIG. 2/S222). Accordingly, for example, as illustrated in FIG. 3, two navigation routes $r_1$ and $r_2$ are searched out. From the two navigation routes, one navigation route which satisfies a condition such as moving time or moving distance required to move to the destination position $p_2$ is the minimum is displayed on the output device 202.

It is also acceptable that a part of or the entire part of the first road traffic information and the second road traffic information is transmitted as the road traffic information from the navigation server 100 to the navigation apparatus 200, and the navigation route r is set in the navigation apparatus 200 on the basis of the road traffic information.

Thereafter, the second processing element 220 specifies the subject area S containing a part of or the entire part of the navigation route r (FIG. 2/S223). Accordingly, for example, as illustrated in FIG. 3, the subject area S constituted by a plurality of slash-lined meshes is specified. Note that the map portion displayed on the output device 202 together with apart of or the entire part of the navigation route r may be determined as the subject area S.

Furthermore, the second processing element 220 determines whether the index information $idx(d_i)$ of the differential information $d_i$ for the subject area is present or not in memory (FIG. 2/S224). In the case where the index information $idx(d_i)$ is present in memory (FIG. 2/S224 . . . YES), the second processing element 220 generates the preliminary information $pre(d_i)$ on the basis of the index information $idx(d_i)$ and outputs it to the output device 202 (FIG. 2/S225). As a result, for example, as illustrated in FIG. 4, a line joining a plurality of points (represented with symbols X) in the newly opened road $r_0$ which is included in the index information $idx(d_i)$ is displayed on the output device 202 as the preliminary information $pre(d_i)$ indicating the newly opened road $r_0$, namely a brief summary (general allocation and shape) of the differential information $d_i$. It should be noted that the preliminary information $pre(d_i)$ may be displayed with color different to that used in the other roads to enable the user to distinguish it easily from the other roads.

Further, the second processing element 220 displays on the output device 202 buttons "YES" and "NO" which may be operated by touching, in addition to the preliminary information $pre(d_i)$ and a questioning message of "Update map information?". A touch to the "YES" button (a request operation) or a touch to the "NO" button (no request operation) is determined by the second processing element 220 (FIG. 2/S226).

In the case where the request operation is determined to have been performed, the second processing element 220 transmits the request signal Req demanding the differential information $d_i$ to the navigation server 100, together with the navigation identifier ID of the navigation apparatus 200 (FIG. 2/Arrow A4).

According thereto, the second support processing element 120 in the navigation server 100 recognizes the navigation identifier ID and the request signal Req (FIG. 2/S121).

Thereafter, the second support processing element 120 determines whether the combination of the navigation identifier ID and the index information idx($d_i$) has been registered in the distribution history element 105 (FIG. 2/S122).

In the case where the second support processing element 120 determines that the information combination has been registered in the distribution history storing element 105 (FIG. 2/S122 . . . YES), the second support processing element 120 transmits the differential information $d_i$ to the navigation apparatus 200 (FIG. 2/Arrow A5).

On the other hand, in the case where the second support processing element 120 determines that the information combination has not been registered in the distribution history storing element 105 (FIG. 2/S124 . . . NO), the present processing is terminated.

Figure 5:
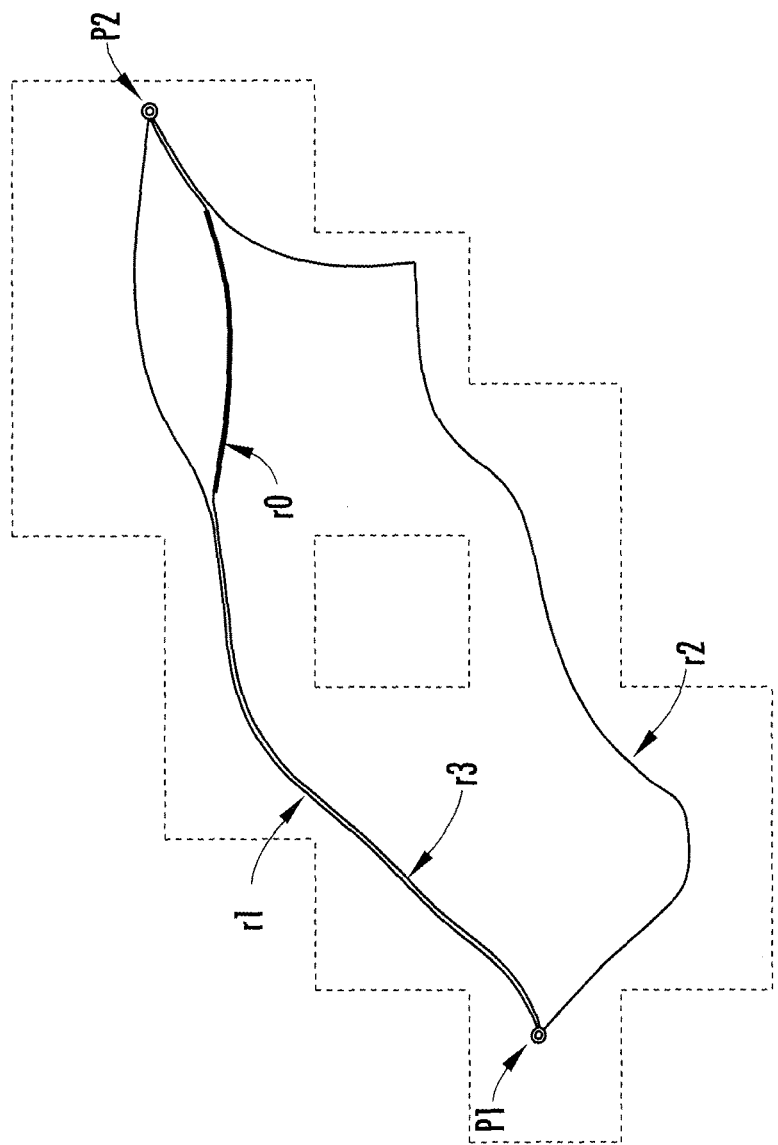
FIG. 5 is a functional diagram illustrating the functions of the navigation system according to the present invention.

The second processing element 220 in the navigation apparatus 200 recognizes the differential information $d_i$ and updates the navigation map information by adding the differential information $d_i$ to the navigation map information stored in the navigation map storing element 204 (FIG. 2/S227). Thereafter, the second processing element 220 deletes the differential information $d_i$ used for the update and the index information idx($d_i$) thereof (FIG. 2/S228). Accordingly, for example the navigation map information including a newly opened road $r_0$ is stored in the navigation map storing element 204. Subsequently, a second processing is performed, and a navigation route $r_3$ including a part of links which constitute the newly opened road $r_0$, as illustrated in FIG. 5, for example, is searched out and displayed on the output device 202, in addition to the navigation routes $r_1$ and $r_2$ formed by the links included in the navigation map information prior to the update.

In the case where the first processing element 210 determines the request operation is not demanded (FIG. 2/S226 . . . 2), the second processing element 220, instead of deleting the index information idx($d_i$), terminates the second processing. Since the index information idx($d_i$) is not deleted, the preliminary information pre($d_i$) may be generated and output one more time through the output device 202 on the basis of the index information idx($d_i$) according to the destination position $p_2$ defined at a future time, as described above, and the navigation map information may be updated according to the request operation from the user (FIG. 2/S225 to S227).

According to the navigation system exhibiting the functions mentioned above, a brief summary of the differential information $d_i$, such as the newly opened road $r_0$ or the like, is recognized by a user via the preliminary information pre($d_i$) outputted by the navigation apparatus 200, therefore, it is possible for the user to determine whether it is necessary to perform a request operation, namely to update the navigation map information (refer to FIG. 2/S225 and S226, FIG. 4). Accordingly, the index information idx($d_i$) and the differential information $d_i$ which possess poor necessity to the user is avoided from being sent to the navigation apparatus 200, thereby, to save information processing resources used to communicate or the like the index information idx($d_i$) and the differential information $d_i$ (refer to FIG. 2/S226).

Moreover, the index information idx($d_i$) and the differential information $d_i$ which are transmitted to the navigation apparatus 200 are refined to the differential information $d_i$ for the subject area S which is determined according to the destination position $p_2$ and the like of the vehicle and the index information idx($d_i$) for identifying the differential information $d_i$. Accordingly, the index information idx($d_i$) and the differential information $d_i$ which are considered to possess poor necessity from the viewpoint of a route r searched by the navigation apparatus 200 to the destination position $p_2$, thereby, to save information processing resources used to communicate or the like the index information idx($d_i$) and the differential information $d_i$ (refer to FIG. 2/S223 and S224, and FIG. 3).

As a result, it is expected to efficiently utilize communication resources and save communication cost between the navigation server 100 and the navigation apparatus 200.

Moreover, by considering the necessity of updating the navigation map information used by the navigation apparatus 200 to search the navigation route, the navigation map information used respectively by the navigation apparatus 200 and the navigation server 100 may be compared and matched at appropriate frequency and timing.

The differential information $d_i$ used to update the navigation map information and the index information idx($d_i$) thereof are discarded or erased from the memory (refer to FIG. 2/S228). As a result, the differential information $d_i$ and the index information idx($d_i$) which have been used to update the navigation map information and therefore are not needed anymore are deleted to avoid lowering the memory size of the navigation apparatus 200 unnecessarily.

Further, the combination of the navigation identifier ID of the navigation apparatus 200 and the index information idx ($d_i$) is registered to the distribution history storing element 105 on a condition that the index information idx($d_i$) is transmitted to the navigation apparatus 200 (refer to FIG. 2/S113). Thereby, an identical index information idx($d_i$) for an identical navigation apparatus 200, consequently an identical differential information $d_i$ is prevented from being sent repeatedly (refer to FIG. 2/S112).

In order to prevent the differential information $d_i$ from being distributed repeatedly to the navigation apparatus 200, the combination of the navigation identifier ID and the index information idx($d_i$) is registered in the distribution history storing element 105 (FIG. 2/S113) and whether the combination has been registered is determined in the navigation server 100 (FIG. 2/S122). However, the mentioned processing may be omitted in the navigation server 100. In this case, by determining whether the index information idx($d_i$) is present in the subject area in the navigation apparatus 200 (FIG. 2/S224), it is also possible to prevent the differential information $d_i$ from being distributed repeatedly to the navigation apparatus 200.

Although the present invention has been explained in relation to the preferred embodiments and drawings but not limited, it should be noted that other possible modifications and variations made without departing from the gist and scope of the invention will be comprised in the present invention. Therefore, the appended claims encompass all such changes and modifications as falling within the gist and scope of the present invention.

TRANSLATIONS FOR THE DRAWINGS

FIG. 1:
100: Navigation server
101: First road traffic information storing element
102: Second road traffic information storing element
104: Support map storing element
105: Distribution history storing element
110: First support processing element
120: Second support processing element
ネットワーク: Network
200: Navigation apparatus
201: Input device
202: Output device
204: navigation map storing element
210: First processing element 220: Second processing element
FIG. 2:
100: Navigation server
S111: Recognize (Ver, ID)
S112: Differential information $d_i$ present?
S113: (ID, idx($d_i$)) not registered yet?
S114: Register (ID, idx($d_i$))
S121: Recognize (Req, ID)
S122: (ID, idx($d_i$)) registered?
200: Navigation apparatus
S212: Store idx($d_i$)
S221: Recognize ($p_1$, $p_2$)
S222: Search and output navigation route r
S223: Specify subject area S
S224: Is idx($d_i$) present in subject area S?
S225: Generate and output pre($d_i$)
S226: Operation contents required?
1: Required
2: Not required
S227: Update navigation map information
S228: Delete $d_i$, idx($d_i$)
FIG. 3: None
FIG. 4: None
FIG. 5: None

What is claimed is:

1. A navigation apparatus which guides a mobile subject on the basis of communication with a navigation server, comprising:
   a navigation map storing element which stores navigation map information;
   a first processing element which:
      recognizes index information which includes latitude and longitude of each of a plurality of locations on a road and a road category of the road, and which relates to a part of differential information between the navigation map information stored in the navigation map storing element and support map information stored in a support map storing element provided in the navigation server on the basis of communication with the navigation server,
      wherein the index information comprises information relating to what subject areas contain the differential information such that the navigation apparatus is not updated until a request is received from the navigation apparatus; and
   a second processing element which:
      recognizes a departure or present position and a destination position of the mobile subject,
      searches or defines a navigation route joining the departure or present position and the destination position on the basis of the navigation map information,
      determines whether the differential information is present in a subject area containing the navigation route on the basis of the index information recognized by the first processing element,
      connects the plurality of locations on the road included in the index information, and generates and automatically outputs preliminary information indicating a brief summary of the differential information on the basis of the road category of the road on a condition that it is determined that the differential information is present in the subject area,
      wherein the preliminary information indicating the brief summary comprises at least one of a rough position of a new road, a road category of the new road, and an open time period of the new road,
      determines whether a request operation by a user is present,
      transmits a request signal for the differential information to the navigation server in response to determining that the differential information is present in the subject area containing the navigation route based on the index information and in response to determining that the request operation is present, and
      receives the differential information from the navigation server, and
      updates the navigation map information on the basis of the differential information,
      wherein upon updating the navigation map information, deletes the differential information and the index information to avoid lowering available memory in the navigation apparatus.

2. The navigation apparatus according to claim 1, wherein the memory stores the differential information and the index information of the differential information.

3. A navigation server which supports a guidance of a mobile subject guided by a navigation apparatus on the basis of communication with the navigation apparatus, comprising:
   a support map storing element which stores support map information;
   a first support processing element which:
      recognizes version information indicating a version of navigation map information stored in a navigation map storing element which is provided in the navigation apparatus,
      recognizes a navigation identifier for identifying the navigation apparatus, on the basis of communication with the navigation apparatus,
      determines whether newly-opened road information of differential information between the navigation map information and the support map information stored in the support map storing element is present on the basis of the version information, and
      transmits index information, which comprises an index of the differential information to the navigation apparatus identified by the navigation identifier in the case where it is determined that the differential information is present,
      generates and automatically outputs preliminary information,
      wherein the index information comprises information relating to what subject areas contain the differential information such that the navigation apparatus is not updated until a request is received from the navigation apparatus,
      wherein the preliminary information comprises at least one of a rough position of the newly-opened road, a road category of the newly-opened road, and an open time period of the newly-opened road; and
   a second support processing element which:
      transmits the differential information to the navigation apparatus in response to determining that the differential information is present in a subject area containing a determined navigation route based on the index information and in response to determining that a request signal for the differential information in accordance with a request operation by a user performed on the navigation apparatus is received from the navigation apparatus to which the index information is transmitted by the first support processing element, and updates the navigation map information on the basis of the differential information, wherein upon updating the navigation map information, deletes the differential information and the index information to avoid lowering available memory in the navigation apparatus.

4. A navigation system comprising:

a navigation apparatus and a navigation server which supports a guidance of a mobile subject guided by the navigation apparatus on the basis of communication with the navigation apparatus, in which the navigation apparatus includes a navigation map storing element configured to store navigation map information;

a first processing element which recognizes index information comprising differential information between the navigation map information stored in the navigation map storing element and support map information stored in a support map storing element provided in the navigation server on the basis of communication with the navigation server, wherein the index information comprises information relating to what subject areas contain the differential information such that the navigation apparatus is not updated until a request is received from the navigation apparatus; and a second processing element which:
  recognizes a departure or present position and a destination position of the mobile subject;
  searches or defines a navigation route joining the departure or present position and the destination on the basis of the navigation map information,
  determines whether the differential information comprising newly-opened road information is present in a subject area containing the navigation route on the basis of the index information recognized by the first processing element,
  generates and automatically outputs preliminary information on a condition that it is determined that the differential information is present in the subject area,
  determines whether a request operation by a user is present,
  transmits a request signal for the differential information to the navigation server in response to determining that the differential information is present in a subject area containing a determined navigation route based on the index information and in response to determining-that the request operation is present, and
  receives the differential information from the navigation server, and
  updates the navigation map information on the basis of the differential information and in response to receiving the request,
  wherein upon updating the navigation map information, deletes the differential information and the index information to avoid lowering available memory in the navigation apparatus; and wherein the navigation server includes:
  a support map storing element which stores support map information;
  a first support processing element which:
    recognizes version information indicating a version of the navigation map information stored in the navigation map storing element which is provided in the navigation apparatus,
    recognizes a navigation identifier for identifying the navigation apparatus, on the basis of communication with the navigation apparatus,
    determines whether newly-opened road information of differential information between the navigation map information and the support map information stored in the support map storing element is present on the basis of the version information,
    transmits index information which comprises a part of the newly-opened road information and which includes latitude and longitude of each of a plurality of locations on the newly-opened road information and a road category of the newly opened road information of the differential information to the navigation apparatus identified by the navigation identifier in the case where it is determined that the differential information is present to generate and output preliminary information including a line joining the plurality of locations on the newly opened road and based on the road category of the newly opened road, and
    if the index information is present in the subject area, prevents repeated transmissions of the differential information to the navigation apparatus; and
  a second support processing element which:
    transmits the differential information to the navigation apparatus on a condition that a request signal for the differential information in accordance with a request operation by a user performed on the navigation apparatus is received from the navigation apparatus to which the index information is transmitted by the first support processing element.

5. The navigation system according to claim 4, wherein the memory stores the differential information and the index information of the differential information.

* * * * *